United States Patent Office 3,026,502
Patented Mar. 20, 1962

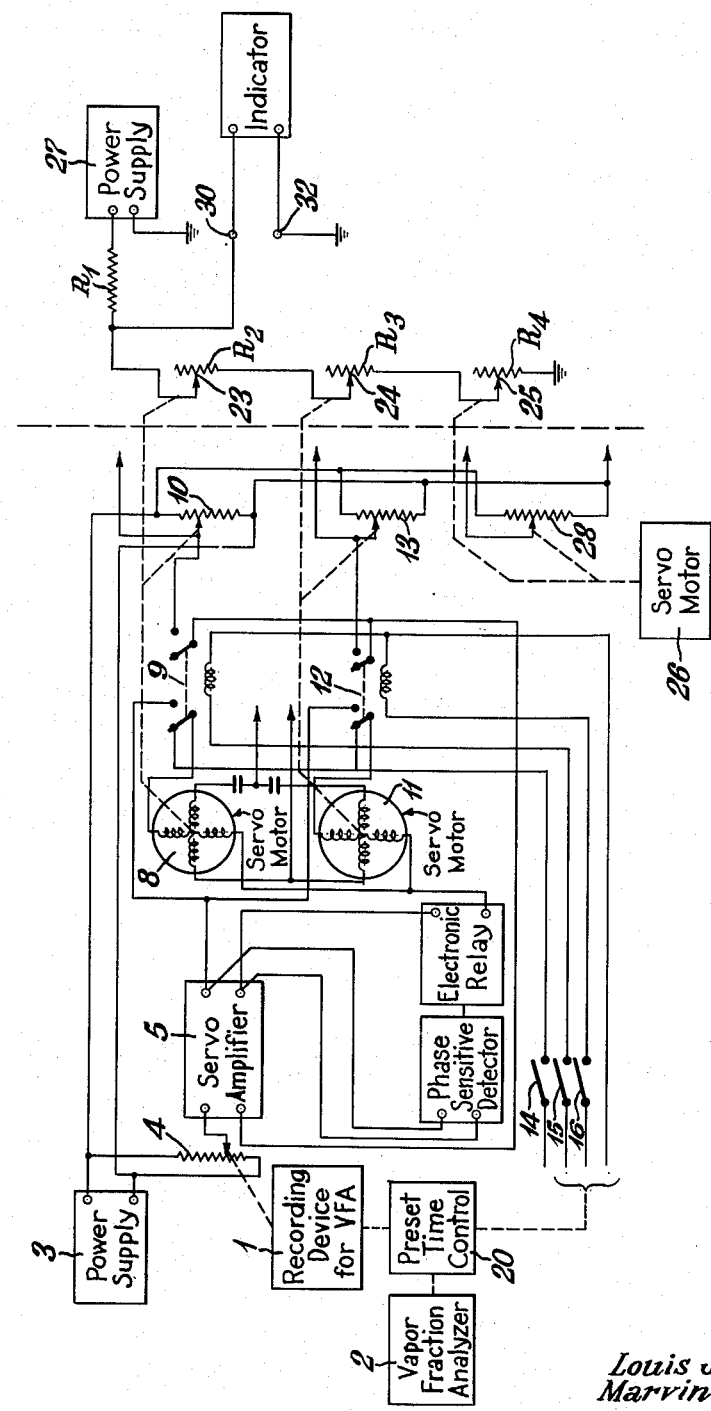

3,026,502
PEAK SIGNAL SUMMATION SYSTEM
Louis J. Rogers, Nitro, and Marvin D. Weiss, Charleston, W. Va., assignors to Union Carbide Corporation, a corporation of New York
Filed Dec. 6, 1960, Ser. No. 74,035
3 Claims. (Cl. 340—187)

The present invention relates to a peak signal summation system for use with a mechanically actuated peak signal storage device. More particularly it relates to such a system for use with a gas chromatographic analyzer wherein direct proportionate readings of any desired component percentages may be obtained.

The present state of automatic process control in the chemical industry requires an ever increasing number of highly specialized instruments for performing detection, storage, analysis, and control functions.

In recent years gas chromatography instruments have been developed which are able to make extremely accurate quantitative measurements of the individual components of a multi-component gas stream.

These measurements have been successfully used to monitor and control certain chemical processes in conjunction with human operator and computing machines.

Briefly, a gas chromatograph is a device which physically separates the components of the multi-component gas system and produces a set of electrical output signals each of whose maximum amplitudes is proportional to the concentration of each component.

Thus, each time a sample measurement of a process stream is made by such a detection instrument, a series of electrical pulses is obtained wherein the components are represented in the same order but wherein the amplitude of successive signals at the same position in the order will vary. It is also important that the maximum amplitude or peak point in each signal is an accurate indication of the process variable being measured.

For a more complete discussion of gas chromatography theory and apparatus, reference is made to U.S. patent application Serial No. 720,607 of L. J. Rogers, filed March 11, 1958.

In past practice a recorder which produces a bar graph for each signal has been connected to the chromatography column, the maximum amplitude is read off by a human operator and an appropriate setting made on a computer. However, for maximum efficiency, accuracy, speed and above all complete automation of such a process an apparatus has recently been developed which is capable of automatically determining the peak point of each successive signal in a set, storing such signal until needed, and resetting or readjusting to a new point when a subsequent signal is received.

Briefly, such a signal storage means follows the input signal from the analyzer and indicator by means of a servo system and keeps increasing the magnitude of a stored signal until the input signal reaches a peak and then when the input signal starts to decrease a phase detector located in the servo system senses this change in a manner which will be more fully described later and operates to leave the signal storage means set at its peak or maximum point. A zero reset means which comprises a timer cam operated switch provides an energization source momentarily to the motor means for driving the storage means back to its zero position at which point it is again ready to select and store the signal peak from a subsequent signal.

However, while such a device reads and stores the peak of a plurality of signals representative of the individual components of a gas stream being analyzed it does not provide any means for obtaining a cumulative signal representative of the total of all or selected ones of said components. Nor does such a device provide any means for directly reading a volume percentage indication of such total of components. For a number of chemical processes it is very important not only to have the individual component indications but to have an indication of the total of the components being analyzed for. As, for example, in determining the total of impurities in a process gas stream.

It is accordingly the primary object of the present invention to provide a signal summation system for use in combination with a chromatographic analyzer and a peak reading signal storage system of the type described which will algebraically add individual component signals to give a resultant summation signal.

It is a further object to provide such a summation system which may be so arranged as to give a direct volume percentage indication of such summation signal with high resolution and accuracy.

Other objects and advantages will be apparent from the accompanying description and drawings in which:

The FIGURE is a combination block and schematic diagram of a peak signal summation circuit according to the present invention.

The objects of the invention are accomplished in general by a peak signal summation circuit for use with a gas chromatographic analyzer and a peak signal storage system wherein the output of the analyzer is a recurring signal set for each analysis having a plurality of individual signals each of which is representative of the concentration of one of the components of a gas stream being analyzed, each signal of the set being variable in amplitude but occurring at fixed predetermined times in recurrent sets. The output of the analyzer is fed to an indication means which also has a mechanical output whose magnitude is instantaneously proportional to the output of the analyzer. The mechanical output of the indicator is fed to the peak signal storage means which comprises a first means mechanically connected to the indicator for producing a first electrical signal proportional to the mechanical displacement of the indicator and a plurality of signal storage means each of which is mechanically adjustable in response to a servo motor means therefor to develop and store a second electrical signal.

The first and second electrical signals are fed to a servo amplifier which detects the difference between said two signals and produces an output signal in response thereto. The servo motor is connected to the output of the amplifier, operable on said output signal and is mechanically connected to adjust the storage means in a direction which will tend to reduce said difference between the first and second electrical signals. A phase detection means is also connected to the output of the amplifier means which is operable to interrupt the signal to the motor means when the magnitude of the second electrical signal exceeds that of the first electrical signal. A timer cam operated switch means is also provided to apply a zero reset voltage to the servo motor to return the storage means to zero at the end of an operating cycle. Each signal storage means and associated servo motor means therefore are selectively connectable to the amplifier as another component signal is produced by the amplifier. The summation system comprises a plurality of variable resistors connected in series across a direct current power supply, wherein the movable contact on each variable resistor is mechanically coupled to a servo motor of the signal storage means whereby each variable resistor is successively adjusted by one of the signal storage means motors as successive signals are received from the analyzer during a given analysis. A fixed current limiting resistor is also connected in series with the variable resistors of a resistance value substantially greater than the sum of the maximum resistance values of the variable resistors. The voltage across all of the variable resistors in the summation circuit subsequent to the last signal of a signal set being received by the storage means is thus representative of the total amount of components analyzed for in the gas chromatographic analyzer.

In a preferred form of the invention the individual resistance values of the variable resistors may be chosen, as will be discussed subsequently, so that a direct indication in terms of volume percentage of said components may be obtained.

Having set forth the general objects and operation of the instant invention, it will now be described in greater detail with specific reference to the drawing. As set forth above, the summation circuit of the present invention is adapted to be used in combination with a vapor fraction analyzer and a specific peak signal storage system.

In a vapor fraction analyzer (gas chromatograph), indicated at 2 in the drawing, a continuous and constant flow of carrier gas passes through a reference cell, which is sensitive to the thermal properties of the carrier gas, and into a separating column. Periodically, multi-component gas samples are admitted into this carrier gas and are carried into the separating column. Each component separated within the column emerges from it admixed with carrier gas as a binary mixture. Each of the binary mixtures passes in succession through a measuring thermal properties cell and from thence to a vent line. The reference and measuring cells, which respond to the thermal properties of the gases flowing respectively therethrough, constitute the detector and are connected into a Wheatstone bridge circuit whose output signals are proportional to the difference between the thermal properties of the two gases which in turn are very accurate indications of the amount of gas mixed with the carrier gas passing through the measuring cell. The passage of each of the binary mixtures through the measuring cell is determined by the component elution time from the separating column and these times are carefully set into the programming timer 20 of the chromatograph which times the switching in of the respective bridge signals to an appropriate bridge output signal receiver, such as a millivolt strip-chart recorder indicated at 1 in the drawing.

These output signals are fed into the peak reading storage device by a series of the programmed timer switches, two of which are 15 and 16. The total number of switches is equal to the total number of gas components required for the analysis although only two are shown. When a gas component is being analyzed its corresponding channel switch such as 15 is closed by the timer 20. (Later, when the next gas component is ready to be analyzed, "15" opens and the timer closes switch contact "16" or the contact of whatever channel is scheduled.) Switch 15 switches the component signal to the vapor fraction analyzer recording device 1. At the same time, relay 9 is energized (relay "12" would be energized if switch "16" were closed, etc.) and connects servo motor 8 and storage potentiometer 10 into a servo loop with a precision potentiometer 4, and servo amplifier 5. The gas component signal, applied from the analyzer detector 2 to the recorder 1 causes the recorder pen assembly to be driven up-scale. The recorder itself is a potentiometric device, with a servo amplifier of its own and a servo motor which drives the recorder pen, and records the signals derived from the detector. The potentiometer 4 is mechanically coupled to the shaft of one of the gears situated between the recorder servo motor and the recorder pen, so that its angular displacement is made proportional to the detector output. Thus the gas component signal, applied from the analyzer detector 2 to the recorder 1, also causes the potentiometer 4 to rotate with an angular displacement proportional to the signal. The potentiometer 4 and all of the storage potentiometers 10, 13, 28, etc. are all connected in parallel and supplied by a regulated D.C. power supply 3. When the recorder mechanism rotates the shaft of the potentiometer 4, its output voltage is connected to the servo amplifier 5. The output of the servo amplifier 5 drives servo motor 8 so that the storage potentiometer 10, connected in tandem, moves with it until the voltage developed across storage potentiometer 10 slidewire is equal or approaches being equal to the voltage developed across the slidewire of retransmitting potentiometer 4 at which time a null balance occurs. This servo action allows the slidewire of the storage potentiometer 10 to follow the rotation of the slidewire of the potentiometer 4.

In order for a signal proportional to the gas concentration of the first component to be stored by potentiometer 10, its slidewire must follow the potentiometer slidewire 4 in angular displacement to the maximum up-scale position corresponding to maximum indication for this gas component magnitude and remain there when the retransmitting potentiometer 4 returns to zero. To accomplish this, the input of a phase sensitive detector 6 is connected to the output of the servo amplifier 5, and the output of the phase sensitive detector to the grid of a thyratron tube. The servo amplifier is very sensitive to D.C. voltage polarity reverses at its input, and its A.C. output will reverse 180 degrees in phase if the D.C. input voltage reverses polarity.

The poentiometer 4 will always move faster than storage potentiometer 10, because potentiometer 4 furnishes the unbalance to the servo loop and potentiometer 10 requires an interval of time to balance with it. If the slide contact of potentiometer 4 is moving in a positive direction as it would be when the recorder pen is drawing the leading edge of an increasing signal, the voltage taken from potentiometer 4 ($e_1$) will be greater than the voltage taken from the storage potentiometer 10 ($e_2$), because potentiometer 4 moves faster than potentiometer 10. The voltage applied to the input of the servo amplifier is ($e_2$) minus ($e_1$) and will be negative in this case. However, as potentiometer 4 starts to move in the negative direction, it still moves faster than potentiometer 10, however, this time the voltage ($e_1$) is less than the voltage ($e_2$), so that, although the servo amplifier still receives the voltage ($e_2$) minus the voltage ($e_1$), the difference voltage is now positive, thus causing the A.C. output from the servo amplifier to shift 180 degrees in phase.

The output of the servo amplifier is coupled to a phase sensitive detector. A number of phase sensitive detectors are known which would be suitable at this point in the apparatus, therefore no specific circuit will be described. The detectors need perform only one function i.e. produce a signal when the A.C. output from the servo amplifier shifts 180 degrees in phase as stated above. This signal may be properly applied to the control grid of a normally conducting thyratron tube having a relay in its plate circuit in a manner readily understood by a person skilled in the art and utilized in conjunction with said relay to open the servo motor supply circuit whereby the servo motor will stop and leave the potentiometer 10 set at its maximum or peak point.

When a second gas component enters the measuring cell of the analyzer, a signal is likewise generated by the analyzer detector. At this time, switch 15 opens and switch 16 closes and simultaneously connects the signal produced by the second component to the recorder and energizes relay 12. Relay 12 connects servo motor 11, storage potentiometer 13, servo amplifier 5 and the retransmitting potentiometer 4 into the servo loop. The storage of a signal on channel 2 of the memory device is accomplished identically as in the case of channel one described above. Additional channels can be connected to the two channel device shown in FIGURE 1 as desired. This would necessitate an additional storage potentiometer, associated servo motor, relay, and actuating switch for each channel. There would normally be a channel provided for each component being analyzed.

After the signals stored in the storage potentiometers are read out by a computer, the memory unit storage potentiometers are simultaneously returned to zero by automatically applying a zero reset voltage to the servo motors through switch 14. Switch 14 is a time delay relay switch operated by the main timer 20 and only applies the reset voltage long enough to drive all the storage potentiometers 10, 13, 28, etc. to their zero positions. This is accomplished by connecting a 115 volt A.C. line voltage of proper phase directly to the servo motors through switch 14. The time delay is set for about two seconds which permits the signal storage potentiometers to be reset to zero.

It is reiterated that the present time control which actuates the valves in the vapor fraction analyzer, the recording device and the actuating switches 15, 16, etc. is determined by the elution time of the components from the separating column and set into said timer by an operator.

While the above described peak signal storage system provides individual peak signals for the various components, the present invention in combination with the peak signal storage system provides for the algebraic addition of all or any selected number of signals representative of such components.

Referring again to the drawing in the section denoted "adder," the potentiometers $R_2$, $R_3$, and $R_4$ are mechanically coupled to the storage potentiometers 10, 13, 28 respectively by a shaft, and therefore to their servo motors, 8, 11, and 26 so that any rotation of the servo motors will produce an equivalent angular displacement in both the storage potentiometers and the respective potentiometers of the adder.

The fixed resistor $R_1$ in the "adder" is considerably larger than $R_2$, $R_3$ and $R_4$ combined and hence primarily determines the current to the extent of establishing a constant current system; i.e., the current will not change significantly when $R_2$, $R_3$, and $R_4$ are varied. The voltage across the sum of $R_2$, $R_3$, and $R_4$ is therefore, directly proportional to their total resistance. When the servo motors of the peak signal storage system turn in the manner set forth, they rotate respective storage potentiometers and adder potentiometers through equivalent angular displacements. The resistances of the adder potentiometers are proportional to their angular rotation, and, since the voltage across each adder potentiometer is also proportional to its resistance, the voltage is proportional to the angular displacement of the servo motors. These series voltages produced across $R_2$, $R_3$, and $R_4$ are directly added and the sum is detected at the output terminals 30 and 32.

Thus, when a complete signal set has been received from the vapor fraction analyzer representative of the components of the gas being analyzed and their respective peaks stored in the storage potentiometers 10, 13, 28, etc. of the peak signal storage system, these peaks will also be proportionately stored in the adder potentiometers 23, 24, 25, and will be readable as a voltage across terminals 30 and 32 which is proportional to their sum. It has also been found that in a number of systems this voltage may be used as a direct volume percentage indication of the total components in the gas stream by the proper choosing of the adder potentiometer resistance values. For example, in some analyses the upper limit of each component in volume percent which is likely to occur is known. Thus with a three component system A, B and C totaling 16% are to be analyzed for—with component A equal to 1%, component B equal to 5%, and component C equal to 10%—the resistances are picked in this ratio (1–5–10). A 100 ohm resistor is used for component A, a 500 ohm resistor for component B and a 1000 ohm resistor for component C. Any other combination of this resistance ratio would also work in this application, such as 10 ohms for component A, 50 ohms for component B, and 100 ohms for component C. The full-scale angular displacement of the potentiometer for component A is then proportional to the 1% desired, the full-scale deflection of the potentiometer of component B to the 5% desired, and the full-scale deflection of the potentiometer C to the 10% desired.

Thus with all three adder potentiometers set at maximum angular displacement the indicator across the output would be calibrated to read 16% and, assuming the indicator had a linear deflection, the scale could be calibrated directly in volume percent.

It is to be understood that in practicing this embodiment of the invention to produce direct volume percent indications the analyzer must be calibrated so that full rotation of the recorder will obtain when each component is eluted and thus full rotation of the retransmitting potentiometer 4 and storage potentiometers 10, 13, 28, etc. In other words, when the first component range is changed from 1% to, for example, .5% maximum, the voltage fed from the analyzer to the recorder for the .5% signal must be changed to again produce full-scale deflection of the recorder and therefore the storage potentiometers and the adder potentiometers. This is conveniently done by adjusting the range adjustments in the analyzer bridge and output circuit. Such changes are normally provided for in commercially available analyzers in the form of resistor patch boards or potentiometers inserted by timer actuated selector switches. In this manner it is assured that the maximum resolution and accuracy which are potentially available in the instrument are utilized. The convenient substitution of adder potentiometers by other potentiometers whose resistance values cause direct-reading output signals to obtain while still employing the same—i.e.; full-rotation, permits the minimization of undesirable effects due to potentiometer resolution, servo system hysteresis and overshoot, and electrical noise pickup by the signal transport system.

It may thus be seen that the instant adder circuit when used in conjunction with a vapor fraction analyzer and a peak signal storage system of the class described performs a useful function not obtainable with the storage system alone and that, further, by the judicious selection of circuit components in the adder direct readings may be obtained in certain systems where the maximum occurrence of the components is known.

While certain preferred embodiments of the invention have been shown and described, it is to be understood that certain modifications and substitutions could be made by a person skilled in the art without departing from the spirit and scope thereof. For example, while voltage addition has been shown, current addition might be employed.

What is claimed is:

1. In a signal storage system for use with a vapor fraction analyzer and an indicating device therefor wherein the output of the analyzer is a recurring signal set each set having a plurality of individual signals of varying amplitude occurring at fixed predetermined times each of which is representative of the concentration of a plurality of gas components and the output of the indicator is a mechanical displacement proportional to the instantaneous amplitude of each signal, which analyzer comprises first means mechanically connected to the indicator for producing a first electrical signal proportional to said mechanical displacement, a plurality of signal storage means each of which is mechanically adjustable to develop and store a second electrical signal, means connecting said first and for selectively connecting one of said second electrical signals to an amplifier, means for producing an output signal when a difference exists between said two signals, a plurality of motor means selectively connected to the output of said amplifier operable on said output signal, each motor means being mechanically connected to one of said storage means for adjusting same in a direction which will reduce the difference between the first and second electrical signals, phase detection means also connected to the output of the amplifier means which will produce an output signal when the magnitude of the second electrical signal exceeds the magnitude of the first electrical signal, means connected to the output of said phase detector means for interrupting the power to the motor means upon an output therefrom, and means selectively operable to reset said signal storage means to zero the improvement which comprises a plurality of variable resistances each of which is mechanically connected to one of said motor means and is moveable therewith to produce a resistance value proportional to the mechanical displacement of the motor means, wherein all of said variable resistances are connected in series with each other and a current limiting resistor substantially larger than the sum of all of said variable resistances across a power source, and means for detecting the voltage drop across said variable resistances after a complete signal set has been stored by the signal storage means and prior to resetting of the signal storage means.

2. A system of the character set forth in claim 1 wherein the maximum percentage by volume of any component which will occur in the gas system is known and wherein the maximum resistances of the individual variable resistances are chosen in the same ratio as the maximum volume percentages of the various components whose concentration by volume representative signal will be stored thereon.

3. A system of the character set forth in claim 2 wherein the output of the analyzer is chosen to produce full-scale deflection of a recorder, the signal storage means, and the variable resistances for the maximum magnitude expected of each component signal whereby optimum sensitivity and accuracy of the system are obtained.

References Cited in the file of this patent

UNITED STATES PATENTS

| | | |
|---|---|---|
| 2,631,778 | Piper | Mar. 17, 1953 |
| 2,997,698 | Masson | Aug. 22, 1961 |